United States Patent
Denton et al.

[11] Patent Number: 5,971,357
[45] Date of Patent: Oct. 26, 1999

[54] FLUID DELIVERY VALVE

[75] Inventors: Marshall T. Denton; Mark A. Christensen, both of Salt Lake City, Utah

[73] Assignee: Wolfe Tory Medical, Inc., Salt Lake City, Utah

[21] Appl. No.: 08/971,075

[22] Filed: Nov. 14, 1997

[51] Int. Cl.⁶ .................................................. F16K 13/04
[52] U.S. Cl. ........................ 251/144; 251/342; 251/348
[58] Field of Search .................................. 251/342, 343, 251/348, 4, 144

[56] References Cited

U.S. PATENT DOCUMENTS

| | | | |
|---|---|---|---|
| 1,418,592 | 6/1922 | McGee | 251/342 |
| 2,219,604 | 10/1940 | Trotter . | |
| 2,706,101 | 4/1955 | Cantor | 251/342 |
| 2,946,555 | 7/1960 | Cantor | 251/342 |
| 2,989,961 | 6/1961 | Blanchett . | |
| 3,517,909 | 6/1970 | Santomieri | 251/4 |
| 3,822,720 | 7/1974 | Souza | 137/525.1 |
| 3,965,925 | 6/1976 | Gooch | 137/451 |
| 4,176,683 | 12/1979 | Leibinsohn | 137/559 |
| 4,181,140 | 1/1980 | Bayham et al. | 251/342 |
| 4,340,049 | 7/1982 | Munsch | 251/342 |
| 4,690,375 | 9/1987 | Vorhis | 251/342 |
| 4,850,566 | 7/1989 | Riggert | 251/7 |
| 4,913,401 | 4/1990 | Handke | 251/342 |
| 4,968,294 | 11/1990 | Salama | 251/342 |
| 5,060,833 | 10/1991 | Edison et al. | 251/342 |
| 5,085,349 | 2/1992 | Fawcett | 251/342 |
| 5,104,016 | 4/1992 | Runkel | 222/175 |
| 5,215,231 | 6/1993 | Paczonay | 222/610 |
| 5,265,847 | 11/1993 | Vorhis | 251/342 |
| 5,601,207 | 2/1997 | Paczonay | 251/342 |
| 5,645,404 | 7/1997 | Zelenak | 222/175 |

*Primary Examiner*—A. Michael Chambers
*Attorney, Agent, or Firm*—Trask, Britt & Rossa

[57] ABSTRACT

A fluid delivery valve for use in fluid conducting systems includes a rigid bracing member positioned within a hollow, flexible, resilient valve housing. By applying opposing lateral forces to the external surface of the housing near a widened portion of the bracing member, the valve housing deforms around the widened portion and the valve is actuated. Actuating the valve permits fluid communication between the inner chamber of the valve housing, and a channel which extends through an enlarged portion. The channels are sealed by the inner wall of the housing when the opposing forces are released. The fluid is thus selectively allowed to travel past the bracing member.

36 Claims, 8 Drawing Sheets

FLUID DELIVERY VALVE

TECHNICAL FIELD

The invention relates to a valve for use in fluid delivery systems. The valve can be operated by applying opposing forces on the outside of a flexible, resilient valve housing which deforms a center portion of the housing to temporarily open the valve seal and allow the desired medium to flow.

BACKGROUND

Many manually operated valves are known. Some of these valves are intended for operation by hand (as shown in U.S. Pat. No. 4,690,375 (Sep. 1, 1987) to Vorhis), some by mouth (as shown in U.S. Pat. No. 5,601,207 (Feb. 11, 1997) to Paczonay), and others by either hand or mouth (as shown in U.S. Pat. No. 4,850,566 (Jul. 25, 1989) to Riggert). Many of these valves open to allow fluid flow by the application of opposing forces on an external part of the valve causing the valve housing, an internal component thereof, or both, to deform.

Valves of this kind have many applications in the art including use with fluid (e.g., a non-solid such as a liquid or gas) conducting tubes in a laboratory or hospital, nourishment tubes for pilots, astronauts, or others required to wear protective suits, drinking bottles, and other applications where it is beneficial for a person to keep one or both hands free to do something else; like ride a bicycle, or drive a car. By using a valve which is easily opened by a single hand or by mouth, a person can conveniently continue a desired action and still operate the valve.

However, currently known valves may have undesirable characteristics associated with them. These undesirable characteristics include relatively low flow rates, relatively complicated methods of operating the devices, parts which wear out or do not maintain a seal after extended or repeated use, and specialty parts which are not replaceable without replacing the entire system or large parts of the system. It is desirable to have a valve that, in addition to being easily operated by one hand, or by mouth, is comfortable for oral actuation, has a high flow rate, does not leak over long periods of repeated use, is easily replaced if damaged, and is relatively inexpensive to manufacture.

DISCLOSURE OF THE INVENTION

The invention includes a valve housed in a hollow, flexible, resilient housing. A bracing member is positioned within the hollow housing along the longitudinal axis of the housing. The bracing member is enlarged at a first end to contact the internal wall surface of the housing, fill the area of the housing surrounding the enlarged end, and create separate spaces on either side of the enlarged first end. The bracing member further includes a widened portion associated with the enlarged end and extending therefrom. The widened portion having sides, an end associated therewith, and a surface running along the sides and end. The surface contacting a portion of the inner wall surface of the housing. A conduit (e.g. a channel or tube) is partially defined by the surface associated with the widened portion. The conduit extends from the enlarged end to a section of the widened portion so that exposed portions of the conduit abut the inner wall surface thus creating a substantially fluid tight seal which separates the spaces on either side of the enlarged end and prevents fluid flow through the conduit from the valve housing interior.

By applying pressure on opposing sides of the valve housing near the widened portion of the bracing member (e.g., by pinching the valve housing), the internal wall surface deforms around the widened portion thereby temporarily interrupting the seal, thus allowing fluid communication between the spaces on either side of the enlarged end by way of the conduit. When such opposing pressure is ceased, the resilient housing reforms to create a seal over an exposed portion of the conduit, thereby closing the valve and disrupting the fluid flow through the conduit.

Some of the advantages of this invention are seen in its safe and easy use, reliability, inexpensive manufacture, and simple replacement of parts. By using a flexible, resilient material as the valve housing, oral actuation is comfortable. Further, because the valve housing can be separate from the rest of the system and is not required to be specifically formed with ridges or bulging regions, if parts become worn or contaminated, replacement is relatively easy and inexpensive. The valve, because of its design, can hold a significant amount of pressure, has a high flow rate, is reliable, and creates a sufficient seal even after extended and repeated use. Because the valve housing can also be sized to interface with existing parts in standard applications, for example, with drinking systems where common tubing or bottle sizes are used, no need exists to buy or manufacture unneeded additional parts. Because it is able to withstand pressure, it can be used with pressurized systems such as pressurized bottles, and other pressurized fluid delivery systems. Moreover, because the bracing member can be sized to use an existing tube as housing, manufacturing expense can further be reduced.

Other features, advantages, and objects of the present invention will become apparent from a consideration of the drawings and ensuing description.

A preferred use of the current invention is by oral actuation to conduct fluids to the mouth from a storage unit such as a tank, bottle, or bag. However, as will be clear to one of ordinary skill in the art, many other possible uses for this valve exist including, for example, other fluid conducting systems using the valve as either an orally or manually actuated valve, a pinch valve, an in-line valve, or a junction valve.

BRIEF DESCRIPTION OF THE FIGURES

In the drawings, which depict presently preferred embodiments of the invention and in which like reference numerals refer to like parts in different views.

BEST MODE FOR CARRYING OUT THE INVENTION

Figure 1:
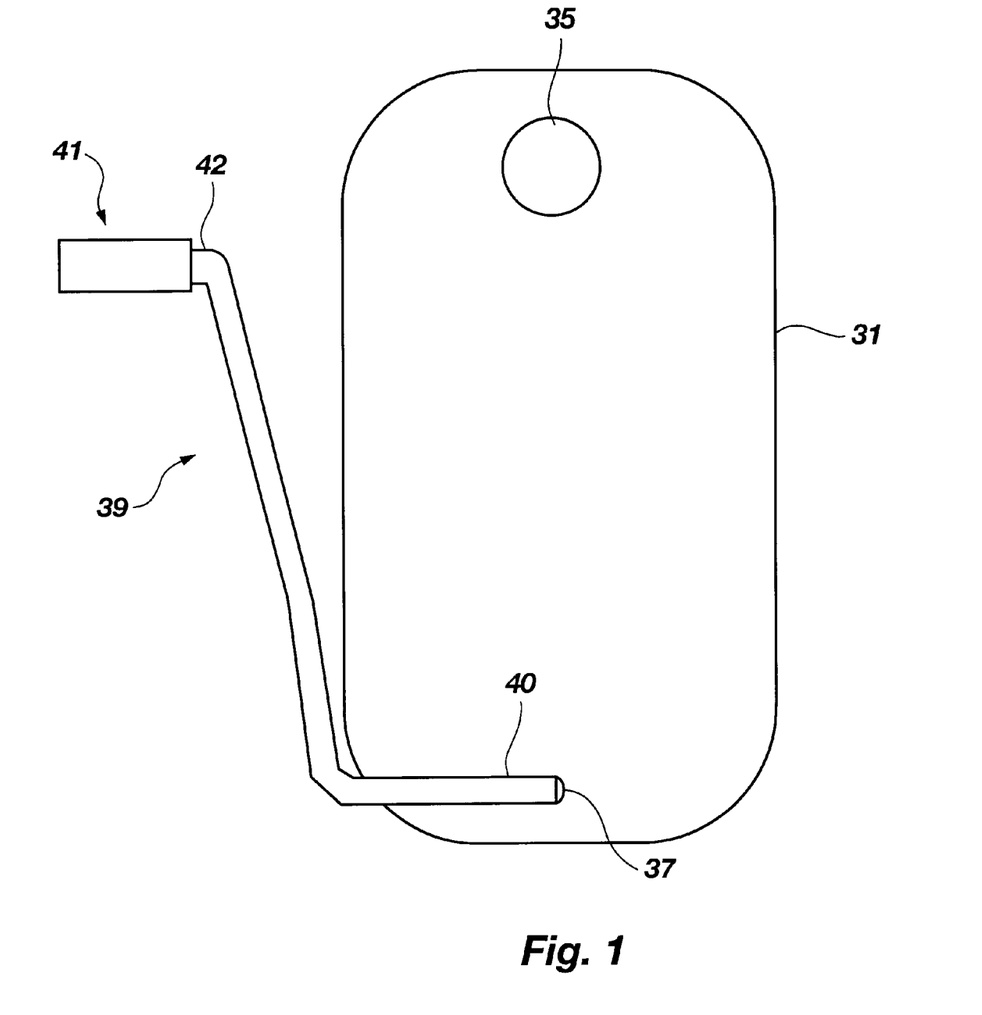
FIG. 1 is one embodiment of the present invention associated with a bag containing fluid and a fluid conducting tube.

FIG. 1 depicts a preferred valve 41 according to the invention for use with a container such as a bag 31 containing fluid and a tube 39 for conducting fluid from the bag 31 to the valve 41. The collapsible bag 31, similar to that commonly found in hospitals, has a first opening 35 near one end for receiving fluids such as water, and a second opening 37 near another end for releasing fluids. The first opening 35 may be sealed with a removable cap when it is not receiving fluid. The second opening 37 is fixedly connected in fluid-tight relationship to a first end 40 of the fluid conducting tube 39 which may be of any length necessary for a specific application.

The tube 39 can be any of numerous commonly used tubes made of flexible resilient material including those made of plastic, rubber, silicon, or other similar material; for example, a hospital intravenous feeding tube, or a bicyclist's drink bag feed tube. It is understood that the durability required of the tube, and thus the dimensions and material used for the tube, may vary by application. A second end 42 of the fluid conducting tube 39, which is distal to the first end 40, is contained within the valve housing 43. For this preferred embodiment, the valve 41 is intended as a bite valve, and is actuated selectively by orally applying external, opposing forces on the valve housing 43.

FIGS. 1–5, depict a preferred embodiment of the bite valve 41 with portions of the housing 43, and the second end 42 of the fluid conducting tube 39 removed to show internal portions of the valve 41. The valve housing 43 is formed of flexible, resilient material such as silicone rubber, plastic, or similar material, and is sized to have an internal diameter 44 equal to, or just less than the external diameter 46 of the fluid conducting tube 39 so that a fluid-tight seal is formed when the fluid conducting tube 39 is inserted into the valve housing 43.

Figures 2, 3:
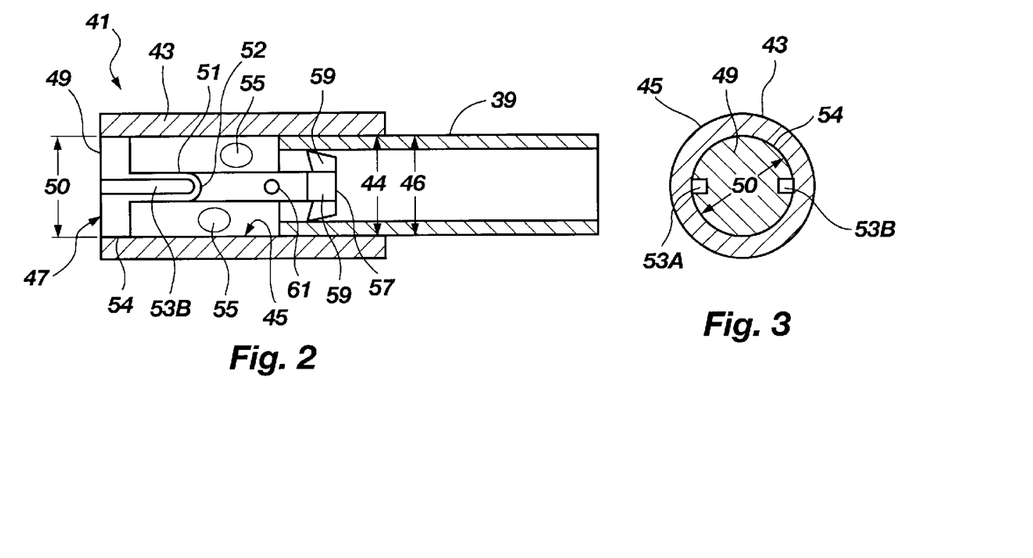
FIG. 2 is a sectional view of one embodiment of the valve with the housing partially removed to show the bracing member; the valve being closed.
FIG. 3 is an end view of the valve of FIG. 2.
Figure 4:
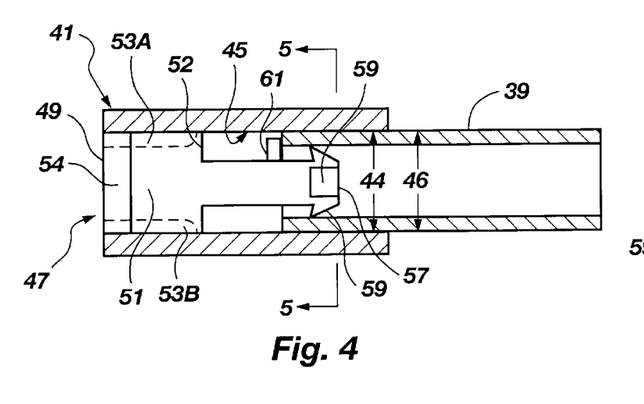
FIG. 4 is a top view of the valve of FIG. 2.
Figure 5:
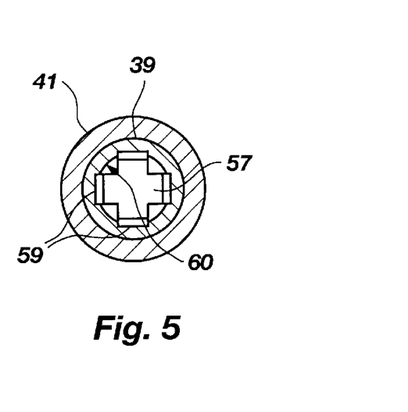
FIG. 5 is a cross-sectional view taken along section line 5—5 of FIG. 4.

The inner wall 45 of the valve housing 43 is also in fluid-tight sealing contact with a rigid bracing member 47 positioned inside the hollow housing 43 along a longitudinal axis of the housing. An enlarged end 49 of the bracing member 47 is substantially disc shaped, preferably with a diameter 50 equal to, or just greater than, the internal diameter 44 of the chosen housing 43 so as to create a substantially fluid tight seal when the bracing member 47 is positioned inside the housing. The bracing member, while preferably formed from a polymer, may alternatively be formed from any rigid material which is inert to the fluid transported through the valve (e.g. rubber, silicon, glass, wood, metal, or other rigid material). A widened portion 51 of the bracing member 47 extends from the enlarged end 49 of the bracing member 47 and has a width equal to the diameter 50 of the enlarged end 49 so that it spans the width of and is in contact with the inner wall 45 of the housing 43. Fluid conducting conduits 53A, 53B extend along the sides of the widened portion 51. The fluid conducting conduits 53A, 53B extend through the enlarged end 49 of the bracing member 47 as seen in FIGS. 2 and 3. As can best be seen in FIG. 2, the end 52 of the widened portion is preferably rounded to improve the seal. When the valve is not being actuated (FIG. 2), the inner wall 45 of the housing 43 abuts the outer circumference 54 or periphery of the enlarged end 49 of the bracing member 47 and the proximal end of the widened portion 51 (i.e., about the lip or edge surrounding the top of the conduit 53A, 53B) to act as a seal to block fluid communication between an inner chamber 55 of the housing and the conduits 53A, 53B. A second, barbed end 57 of the bracing member 47 includes barbs 59 which extend radially to a distance substantially equal to the internal radius 60 of the tube. These barbs, along with the friction caused between the contact of the housing 43 and the fluid conducting tube 39, help maintain the seal between the fluid conducting tube 39 and the housing 43. The barbs 59 are spaced about the barbed end 57 of the bracing member 47 and are preferably large enough to hold the fluid conducting tube 39 in place, yet not so large as to significantly restrict fluid flow through the valve 41. The optimal size of these barbs 59 depends on the size and type of tube used, and the viscosity of the fluid conducted through the tube. A knob 61 preferably extends from the barbed end 57 of the bracing member 47 to prevent the fluid conducting tube 39 from being inserted too far into the housing 43.

Figure 6:
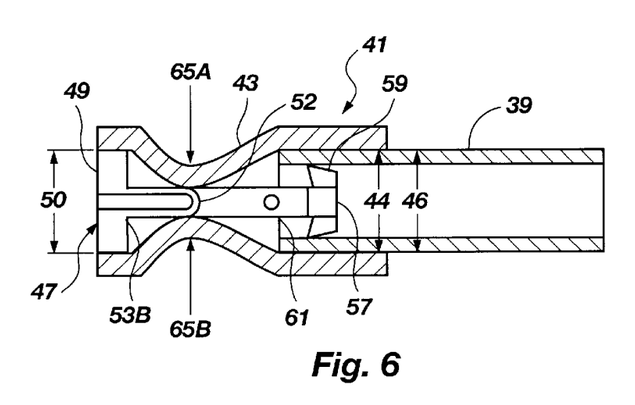
FIG. 6 is a view similar to FIG. 2 showing the valve open.
Figure 7:
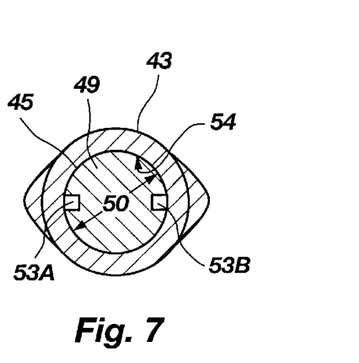
FIG. 7 is an end view similar to FIG. 3 showing the valve open.
Figure 8:
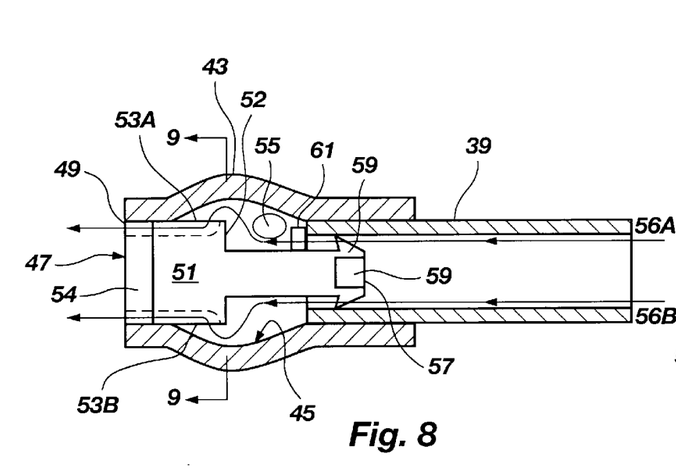
FIG. 8 is a view similar to FIG. 4 showing the valve open.
Figure 9:
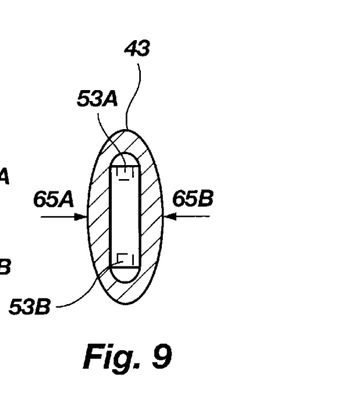
FIG. 9 is a view similar to FIG. 5 showing the valve open, the cross-sectional view taken along section line 9—9 of FIG. 8.

FIGS. 6–9, depict an embodiment of the current invention with the valve being actuated and open. In this embodiment, opposing forces (arrows 65A, 65B) are applied, approximately centrally, to the valve housing 43 of the bracing member 47. The valve housing 43 deforms to expose the conduits 53A, 53B to the inner chamber 55 of the housing 43. As can be seen in FIG. 6 the end 52 of the widened portion is preferably rounded to improve the seal. Suction may be applied by the user's mouth to the enlarged end 49 of the bracing member 47, thus causing fluid to flow from the fluid bag 31, through the fluid conducting tube 39 according to directional flow lines 56A, 56B, through the inner chamber 55 of the housing, and into the user's mouth via the conduits 53A, 53B. As seen in FIG. 7, fluid-tight sealing contact is maintained between the housing 43 and the enlarged end 49 of the bracing member 47 when pressure is applied. When the user releases the pressure on the valve, the resilient housing material reforms to its original shape, thus recreating the seal.

Figure 10:
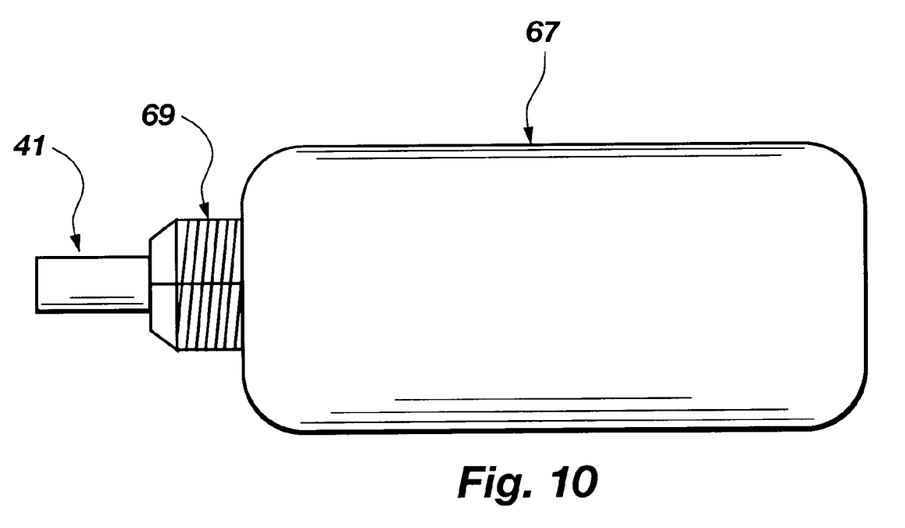
FIG. 10 is a second embodiment of the present invention associated with a bottle containing fluid.
Figure 11:
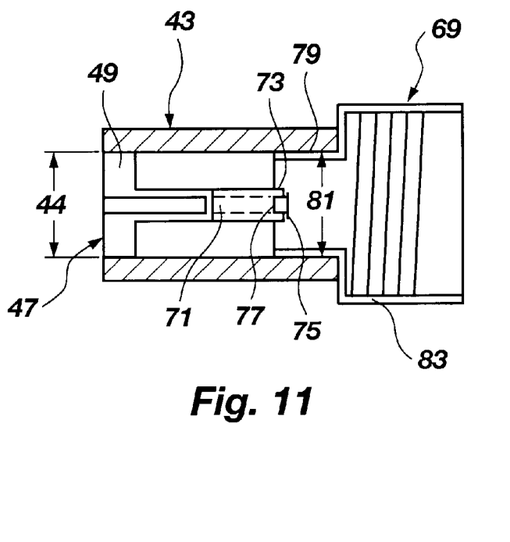
FIG. 11 is a view similar to FIG. 2, but illustrating a second embodiment of the valve.
Figure 12:
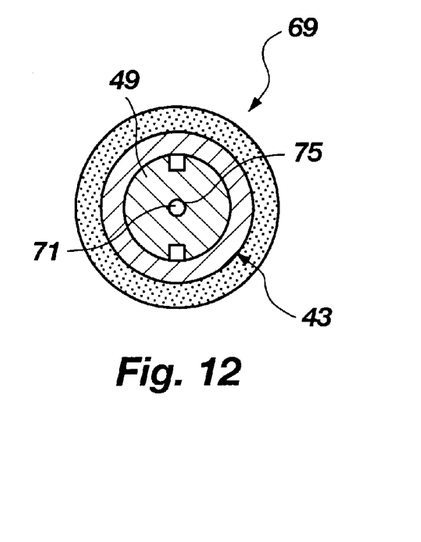
FIG. 12 is an end view of the valve of FIG. 11.
Figure 13:
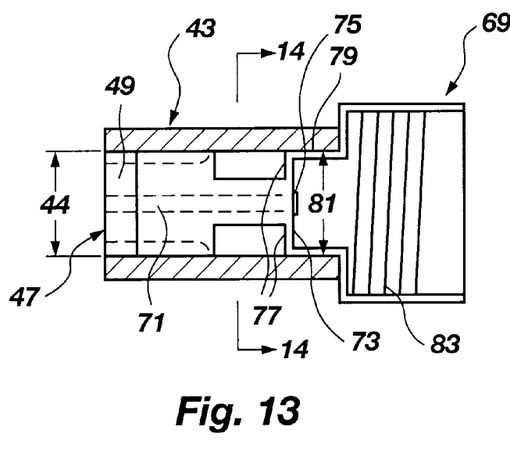
FIG. 13 is a top view of the valve of FIG. 11.
Figure 14:
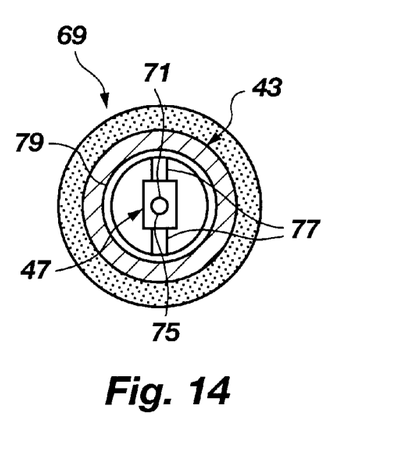
FIG. 14 is a cross-sectional view taken along section line 14—14 of FIG. 11.
Figure 15:
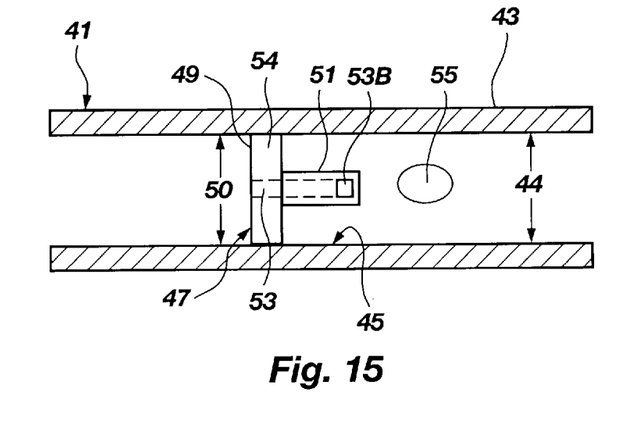
FIG. 15 is a view similar to FIG. 2, but illustrating a third embodiment of the valve.
Figure 16:
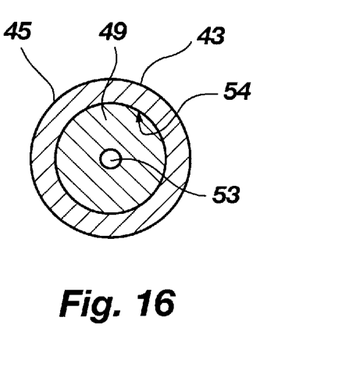
FIG. 16 is an end view of the valve of FIG. 15.
Figure 17:
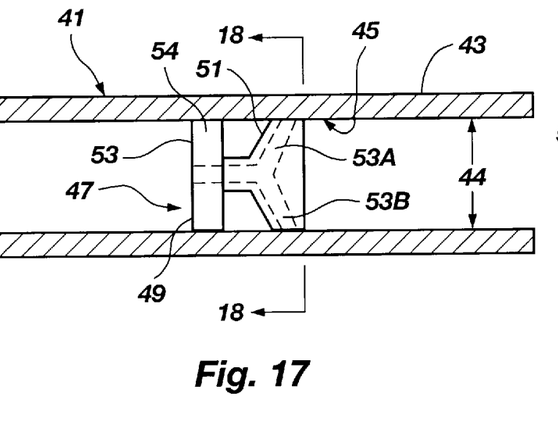
FIG. 17 is a top view of the valve of FIG. 15.

FIG. 10 depicts a second preferred embodiment of the current invention as a valve 41 for use with a container such as a bottle 67 containing fluid. In this embodiment, the valve 41 is threadedly joined to the bottle 67 by an interfacing member 69. The bottle may be any specially formed from plastic, rubber, silicon, glass, or other similar material, or chosen from any one of common bottles found in the market. Some examples of common bottles found on the market include baby bottles, water bottles used by bicyclists or those purchased at a grocery store containing spring water. The interfacing member could be formed of the same material as the bottle, or other similar material, or chosen from existing bottle interfaces, so long as the interface between the valve and the bottle maintains a substantially water-tight seal. It is understood that one of ordinary skill in the art can readily manufacture or select a suitable bottle or interface as both are well known in the art.

FIGS. 11–14, show a second embodiment of the invention wherein the bracing member 47 further includes a pressure release port 71 extending from the enlarged end 49 to an interfacing end 73 of the bracing member 47. The pressure release port 71 prevents water from escaping and allows air to return to the bottle via a hydrophobic filter 75 (e.g., those manufactured by Goretex). The interfacing end 73 of the bracing member 47 also preferably comprises one or more supports 77 which substantially maintain the position of the interfacing end 73 of the bracing member 47 relative to the interfacing member 69. The supports are sized to not significantly impede fluid flow through the valve. The interfacing member 69 preferably has an extended portion 79 with an external diameter 81 substantially equal to or larger than the internal diameter 44 of the housing 43, and an internally threaded portion 83 suitable for interfacing with a container. The valve housing 43 of this embodiment extends over the enlarged end 49 of the bracing member 47 and the extended portion 79 of the interfacing member 69 such that the housing 43 is in sealing contact with the interfacing member 73. Although it is preferred that the bracing member 47, the supports 77, and the interfacing member 69, all be formed as a single part, it is understood that this is not a requirement for the invention. The valve will function well without supports joining the bracing member to the valve. If used, the hydrophobic filter can be fixed to the bracing member by ultrasonic welding, heat sealing, press-fit, or adhesive, or other method known in the art. As will be clear to one of ordinary skill in the art, it is not necessary that the invention have an air release port, or a threaded portion as these are simply for convenience of use. Other interfacing means may alternatively be used; for example, a cap which is fixed by adhesive, formed as part of the bottle, or snaps on and off. In such an instance, the bottle may be made formed of glass, rigid plastic, flexible plastic or other similar material.

FIGS. 15–18, show different views of a third embodiment. In this embodiment, the widened portion 51 is not of a constant width, and the conduits 53A, 53B do not extend separately through the enlarged end 49, but instead meet along the longitudinal axis of the housing 43, to form a single conduit 53 which extends through the center of the enlarged end 49.

Figure 19:
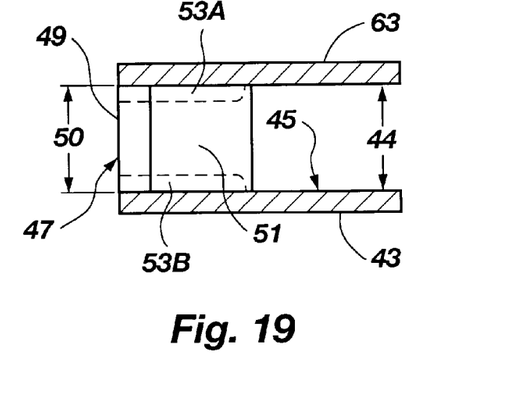
FIG. 19 is a view similar to FIG. 4, but illustrating a fourth embodiment of the valve.
Figure 20:
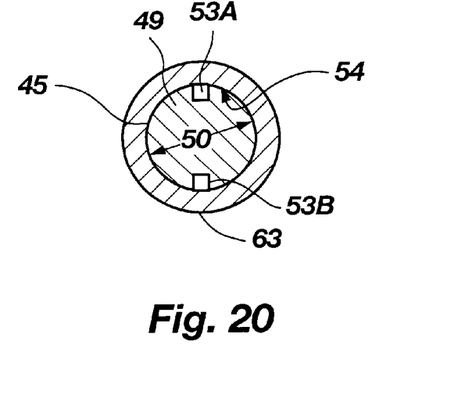
FIG. 20 is an end view of the valve of FIG. 19.

FIGS. 19-20 show a fourth embodiment of the invention wherein the bracing member 47 does not include a barbed end, and is positioned within a secondary tube 63 which serves as the valve housing. Because the diameter 50 of the bracing member's enlarged end 49 is the same size as, or slightly larger than the internal diameter 44 of the housing 43, the bracing member 47 is able to remain substantially in place, and maintain a fluid-tight seal during operation. Similar to previous embodiments, this valve is actuated by applying opposing external forces on the valve housing 43 near the widened portion 51 of the bracing member 47.

Figure 21:
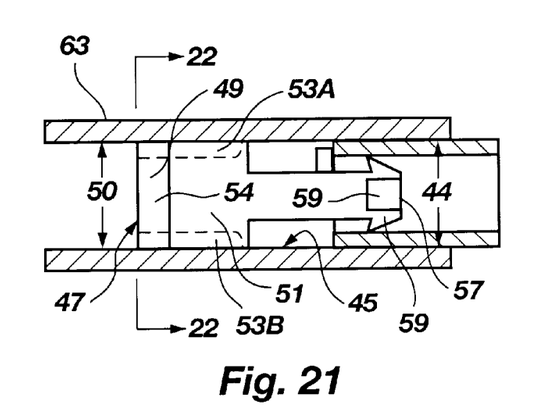
FIG. 21 is a view similar to FIG. 4, but illustrating a fifth embodiment of the valve.
Figure 22:
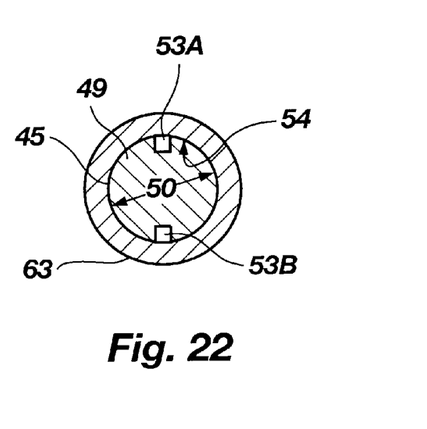
FIG. 22 is cross-sectional view taken along section line 22—22 of FIG. 21.

FIGS. 21-22 show a fifth embodiment of the invention wherein the bracing member 47 is positioned at, and helps to secure, a junction between two tubes. A secondary tube 63 serves as the valve housing. The valve of this embodiment is actuated, similar to other embodiments, by application of opposing forces on the valve housing near the widened portion 51 of the bracing member 47.

Figure 18:
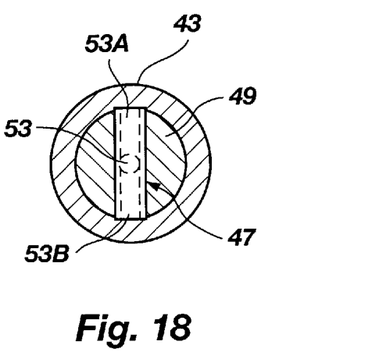
FIG. 18 is a cross-sectional view taken along section line 18—18 of FIG. 17.
Figure 23:
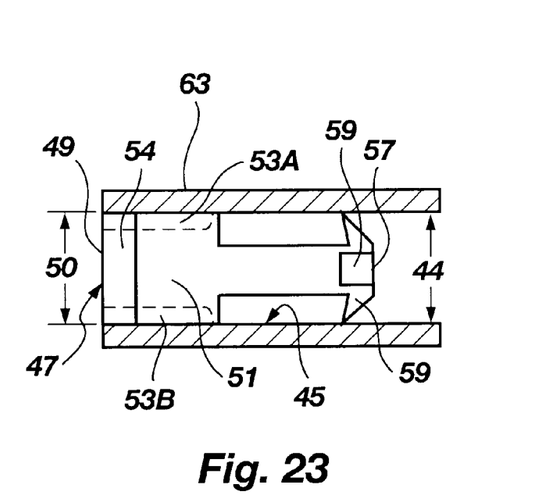
FIG. 23 is a view similar to FIG. 4, but illustrating a sixth embodiment of the valve.
Figure 24:
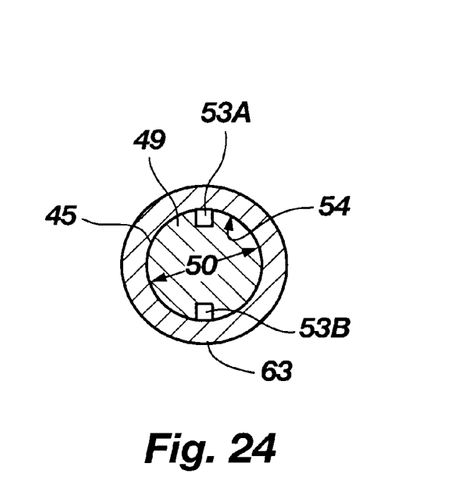
FIG. 24 is an end view of the valve of FIG. 23.

FIGS. 23-24 show a sixth embodiment of the invention wherein the bracing member 47, positioned within a secondary tube 63 which acts as the valve housing, includes a barbed end 57 to assist in holding the bracing member 47 in place. As is shown in FIG. 18, the barbs 59 extend from the barbed end 57 and contact the inner wall surface 45 of the housing 43.

It is contemplated that the various parts of this invention are not restricted to any particular size or shape. For example, the enlarged portion of the bracing member, instead of having a circular cross-sectional area, could have a triangular, square, rectangle, oblong, elliptical, pentagonal, or other shaped cross-sectional area, and still function as contemplated by this invention. Furthermore, to accommodate different applications or designs, different shaped and sized valve housing, tubing, and fluid containers may be used. Alternatively, adhesive may be applied at the various junctions to help create fluid-tight seals and hold respective parts substantially in place. Application of adhesive might be particularly advantageous around the perimeter of the enlarged end which is in contact with the inner wall of the housing, at the junction between the valve housing and the tube or the interfacing member, or at the interface between the interfacing member and the bottle.

The valve of the current invention can be applied in an existing system by placing an appropriately sized housing containing a bracing member on an existing fluid conducting tube or cap used to connect to a fluid source, or more simply by placing an appropriately sized bracing member inside an existing tube. By example, when a user bites down near the widened portion of the valve and applies a suction, the liquid is allowed to flow through the liquid conducting tube, or past the interfacing member to the valve, through the at least one conduit, past the bracing member and into the mouth of the user. If the user does not bite down on the valve, or releases the opposing lateral pressure, the valve is in its rested position and the liquid is sealed off from user's mouth.

Because this invention is comfortably actuated, this valve provides advantages over many previous systems in which the end of the valve housing deforms when actuated. The valve is reliable and durable as it does not leak over extended and repeated use. Furthermore, because the valve housing and tube used in a fluid conducting system are separate, flexible, and not required to be specially formed with ridges or enlarged portions, they can be easily and inexpensively replaced should one or the other become worn. It is, however, contemplated that the valve may be formed with ridges, enlarged portions, or use adhesive to adapt it to different applications.

From these embodiments, it is not contemplated that any conduits be required to extend through the enlarged end completely external to the widened portion, or that the widened portion be a constant width. Further, it is contemplated that this invention can be practiced with one or more conduits, and is not limited to the one or two conduits used here, or to the locations of the conduits shown here. Optionally, more conduits and differently sized conduits may be positioned at locations throughout the widened portion and enlarged portion for ease of use, or convenience for a given application or fluid. The conduits may optionally be filled, or partially filled with a filter medium suitable for removing contaminants (e.g. chemicals or particulate matter) from the medium stored in the fluid source. This invention may be applied in multiple applications using various sized, and shaped tubes and bracing members, and is not intended to be limited by the embodiments or descriptions listed.

After being appraised of the devices according to the invention, methods of making them will become readily apparent to those of skill in the art. For instance, the bracing member, supports, and interface member can be injection molded or similarly formed using a polymer, rubber, silicon, glass, metal, or other material which is inert to the fluid transported through the valve. The housing and tube can each be made of the same, or different types of flexible tubing commonly found in medical supply stores, or sporting goods stores (e.g. made of polyurethane, rubber, plastic, silicon, or similar flexible, resilient material), or specially formed and molded for a particular application or out of a particular material. The fluid container, or source, for example, can be a bag, specially molded and formed for a particular application or purchased in a supply store (e.g., Wolfe Tory Medical Inc., of Salt Lake City, Utah), a bottle, such as that purchased in sporting goods stores or grocery stores, or some other fluid containing device such as a compressed-air tank, a faucet, a cup, or similar container. Alternatively, it is contemplated that this invention will be used in other systems used to transport fluid such as helium, oxygen or other gas, water, gel, or other non-solid material.

Although the invention has been described with regard to certain preferred embodiments, the scope of the invention is not limited by these embodiments and is to be defined by the appended claims.

What is claimed is:

1. A fluid delivery valve comprising:
   a housing, said housing being hollow, flexible, and resilient, and having an inner wall surface, a first end, and a second end; and
   a bracing member positioned within the housing, said bracing member having an enlarged end and a widened portion associated with the enlarged end; said widened portion having sides, an end associated therewith, and a surface running along the sides and end, said surface contacting a portion of the inner wall surface, said widened portion containing at least one conduit for fluid flow from the valve housing's interior to the enlarged end, which conduit extends from the enlarged end along a section of the widened portion so that exposed portions of an opening for the conduit abut the inner wall surface thus creating a substantially fluid-tight seal about said conduit opening preventing fluid flow through said conduit from said valve housing interior.

2. The fluid delivery system of claim 1 wherein the at least one conduit is a channel formed in the widened portion.

3. The fluid delivery system of claim 2 wherein the associated end is generally rounded.

4. The fluid delivery valve of claim 1, wherein the housing and the enlarged end are circular in cross-section.

5. The fluid delivery valve of claim 4, wherein the enlarged end has a diameter equal to or slightly larger than an internal diameter of the housing.

6. The fluid delivery valve of claim 1, further comprising a tube having a first end and a second end; said second end being operably associated with the second end of the valve housing, and the first end being operably associated with a fluid source.

7. The fluid delivery valve of claim 6, wherein the fluid source comprises a bag having a first end and a second end, the first end having a first opening and a removable plug sealing the first opening, the second end being operably associated with the second end of the tube.

8. The fluid delivery valve of claim 1, wherein the valve is an in-line valve.

9. The fluid delivery valve of claim 8, wherein the in-line valve is a valve connecting two tubes of different diameter, one of the tubes comprising the housing.

10. The fluid delivery valve of claim 1, wherein the housing is a secondary tube and the bracing member is positioned at an end of the housing.

11. The fluid delivery valve of claim 1, wherein the bracing member further comprises an interfacing end and a pressure release channel which extends from the interfacing end, and through the widened portion and the enlarged end; wherein an exposed portion of the pressure release channel at the interfacing end is covered by a hydrophobic filter to allow passage of air there through.

12. The fluid delivery valve of claim 1, further comprising an interfacing member operably associated with the second end of the valve housing.

13. The fluid delivery valve of claim 12, wherein the bracing member further comprises supports extending from an interfacing end, positioned within the second end of the valve housing, to the interfacing member so that the positions of the bracing member and the interfacing member are substantially stable relative each other.

14. The fluid delivery valve of claim 12, wherein the interfacing member is operably associated with the second end of the valve housing by an extended portion of the interfacing member; said extended portion having an external diameter substantially equal to or slightly larger than the internal diameter of the valve housing.

15. The fluid delivery valve of claim 1, wherein the bracing member is associated with two channels, which channels extend from the enlarged end along a section of the widened portion so that exposed portions of openings for the channels abut the inner wall surface thus creating a substantially fluid-tight seal about said channel openings preventing fluid flow through said channels from said valve housing interior.

16. The fluid delivery valve of claim 1, wherein the at least one conduit is two conduits which extend from the enlarged end along a section of the widened portion so that exposed portions of the openings for the conduits along the widened portion abut the inner wall surface thus creating a substantially fluid-tight seal about the conduit openings when the valve housing is in its rested position, the conduits joining into a single conduit within the widened portion, the single conduit extending through the enlarged end.

17. A fluid delivery valve comprising:
   a housing, said housing being hollow, flexible, and resilient, and having an inner wall surface, a first end, and a second end; and
   a bracing member in the housing, said bracing member having an enlarged end, a barbed end having barbs positioned within the second end of the tube, and a widened portion associated with the enlarged end and extending towards the barbed end, said widened portion having sides, an end associated therewith, and a surface running contiguously along the sides and end, said surface contacting a portion of the inner wall surface, said widened portion containing a conduit for fluid flow from the valve housing's interior to the enlarged end, which conduit extends from the enlarged end to a section of the widened portion so that exposed portions of an opening for the conduit abut the inner wall surface thus creating a substantially fluid-tight seal about said conduit opening preventing fluid flow through said conduit from said valve housing interior;

wherein upon application of opposing forces to said valve housing, said substantially fluid-tight seal breaks thus allowing fluid flow through said conduit opening and the conduit.

18. The fluid delivery system of claim 17 wherein the conduit is a channel formed in the widened portion.

19. The fluid delivery system of claim 18 wherein the associated end is generally rounded.

20. The fluid delivery valve of claim 17, wherein the housing has an internal radius and the barbs extend radially from the bracing member to a radius substantially equal to the internal radius of the housing to contact the inner wall surface.

21. The fluid delivery valve of claim 17, further comprising a tube having an outer diameter substantially equal to an internal diameter of the housing; said tube further having a first end, a second end, and an inner wall; said first end of the tube positioned within the second end of the housing and around the barbed end of the bracing member, the barbs extending radially from the barbed end of the bracing member and in contact with the inner wall of the tube.

22. The fluid delivery valve of claim 21, further comprising a knob extending laterally from the barbed end of the bracing member so that the tube is prevented from extending into the housing beyond the knob.

23. The fluid delivery valve of claim 22, wherein the enlarged end of the bracing member is positioned at the first end of the housing, the bracing member extends toward the second end of the housing, and the second end of the tube is operably associated with a bag.

24. The fluid delivery valve of claim 23, wherein the bag being collapsible and having an end; and the second end of the tube being operably associated with the bag near an end of the bag.

25. The fluid delivery valve of claim 21, wherein the first end of the housing is elongated, and the barbed end of the bracing member interacts with the tube to hold the housing and the tube together.

26. The fluid delivery valve of claim 17, wherein the housing is a secondary tube having an internal radius and an internal diameter, said enlarged end having a diameter substantially equal to or slightly larger than the internal diameter of the secondary tube, and the barbs extending radially from the bracing member to a radius substantially equal to the internal radius of the secondary tube.

27. A fluid delivery system comprising:

a housing, said housing being hollow, flexible, and resilient, and having an inner wall surface, a first end, and a second end;

an interfacing member having an end operably associated with the second end of the valve housing;

a bracing member positioned within the valve housing, said bracing member comprising an enlarged end positioned within the housing's first end, an interfacing end having one or more supports extending therefrom to the interfacing member, and a widened portion, associated with the enlarged end and extending towards the interfacing end; said widened portion having sides, an end associated therewith, and a surface running contiguously along the sides and end, said surface contacting a portion of the inner wall surface, said widened portion containing a conduit for fluid flow from the valve housing's interior to the enlarged end, which conduit extends from the enlarged end to a section of the widened portion so that exposed portions of an opening for the conduit abut the inner wall surface thus creating a substantially fluid-tight seal about said conduit opening preventing fluid flow through said conduit from said valve housing interior;

wherein, upon application of opposing forces to said valve housing, said substantially fluid-tight seal breaks thus allowing fluid to flow through said conduit opening and the conduit.

28. The fluid delivery system of claim 27 wherein the conduit is a channel formed in the widened portion.

29. The fluid delivery system of claim 28 wherein the associated end is generally rounded.

30. The fluid delivery valve of claim 27 wherein the bracing member further comprises a pressure release port extending through the bracing member, exposed to the atmosphere at the enlarged end, and the interfacing end, and covered at the interfacing end by a hydrophobic filter.

31. A fluid delivery system comprising:

a container;

a valve housing, said valve housing being hollow, flexible, and resilient, and having an inner wall surface, a first end, and a second end;

a tube having a first end and a second end, wherein the first end of said tube is operably associated with the container and the second end of the tube is operably associated with the second end of the valve housing; and a bracing member positioned within the valve housing, said bracing member having an enlarged end, a barbed end having barbs positioned within the second end of the tube, a knob extending laterally from proximal the barbed end so that the tube is prevented from extending into the housing beyond the knob, and a widened portion, associated with the enlarged end and extending towards the barbed end, said widened portion having sides, an end associated therewith, and a surface running contiguously along the sides and end, said surface contacting a portion of the inner wall surface, said widened portion containing a conduit for fluid flow from the valve housing's interior to the enlarged end, which conduit extends from the enlarged end along a section of the widened portion so that exposed portions of an opening for the conduit abut the inner wall surface thus creating a substantially fluid-tight seal about said conduit opening preventing fluid flow through said conduit from said valve housing interior;

wherein, upon application of opposing forces to said valve housing, said substantially fluid-tight seal breaks thus allowing fluid to flow through said conduit opening and the conduit.

32. The fluid delivery system of claim 31 wherein the conduit is a channel formed in the widened portion.

33. The fluid delivery system of claim 32 wherein the associated end is generally rounded.

34. A fluid delivery system comprising:

a container having an externally threaded opening;

a valve housing, said valve housing being hollow, flexible, and resilient, and having an inner wall surface, a first end, and a second end;

an interfacing member having first and second ends, said interfacing member having an internally threaded portion at the second end, and an extended portion at the first end;

wherein the container's externally threaded opening is threadably associated with the internally threaded portion of the interfacing member's second end, and the extended portion of the interfacing member is operably associated with the second end of the valve housing; and a bracing member positioned within the valve housing, said bracing member comprising:
  an enlarged end positioned within the housing's first end;
  an interfacing end having one or more supports extending therefrom to the interfacing member;
  a pressure release port extending through the bracing member, exposed to the atmosphere at the enlarged end and covered at the interfacing end by a hydrophobic filter; and
  a widened portion, associated with the enlarged end and extending towards the interfacing end; said widened portion having sides, an end associated therewith, and a surface running contiguously along the sides and end, said surface contacting a portion of the inner wall surface, said widened portion containing a conduit for fluid flow from the valve housing's interior to the enlarged end, which conduit extends from the enlarged end along a section of the widened portion so that exposed portions of an opening for the conduit abut the inner wall surface thus creating a substantially fluid-tight seal about said conduit opening preventing fluid flow through said conduit from said valve housing interior;
  wherein, upon application of opposing forces to said valve housing, said substantially fluid-tight seal breaks thus allowing fluid to flow through said conduit opening and the conduit.

35. The fluid delivery system of claim 34 wherein the conduit is a channel formed in the widened portion.

36. The fluid delivery system of claim 5 wherein the associated end is generally rounded.

* * * * *

UNITED STATES PATENT AND TRADEMARK OFFICE
CERTIFICATE OF CORRECTION

PATENT NO    :    5,971,357
DATED        :    October 26, 1999
INVENTOR(S)  :    Denton et al.

It is certified that error appears in the above-identified patent and that said Letters Patent is hereby corrected as shown below:

Claim 36, Column 12, line 16, change "claim 5" to --claim 35--.

Signed and Sealed this

Sixth Day of March, 2001

Attest:

NICHOLAS P. GODICI

Attesting Officer

Acting Director of the United States Patent and Trademark Office